US012717133B2

(12) United States Patent
Zahirovic et al.

(10) Patent No.: US 12,717,133 B2
(45) Date of Patent: Aug. 25, 2026

(54) THREE-DIMENSIONAL-IMAGE-BASED EYE TRACKING USING TRIANGULATION

(71) Applicant: GOOGLE LLC, Mountain View, CA (US)

(72) Inventors: Nino Zahirovic, Waterloo (CA); Fan Yang, London (CA); Brendan O'Hanlon, Mountain View, CA (US); Kenneth McCoubrey, Kitchener (CA); Duncan Wesley Strathearn, Waterloo (CA); Niladri Sarkar, Waterloo (CA)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/225,008

(22) Filed: Jul. 21, 2023

(65) Prior Publication Data

US 2024/0027752 A1 Jan. 25, 2024

Related U.S. Application Data

(60) Provisional application No. 63/391,059, filed on Jul. 21, 2022.

(51) Int. Cl.

| | |
|---|---|
| ***G02B 27/00*** | (2006.01) |
| ***G02B 26/08*** | (2006.01) |
| ***G02B 26/10*** | (2006.01) |
| ***G06T 7/73*** | (2017.01) |
| ***H04N 25/47*** | (2023.01) |

(52) U.S. Cl.

CPC ..... *G02B 27/0093* (2013.01); *G02B 26/0833* (2013.01); *G02B 26/101* (2013.01); *G06T 7/74* (2017.01); *H04N 25/47* (2023.01); *G06T 2207/30201* (2013.01)

(58) Field of Classification Search

CPC ............ G02B 27/0093; G02B 26/0833; G02B 26/101; G02B 2027/0187; G02B 27/0172; G06T 7/74; G06T 2207/30201; H04N 25/47

See application file for complete search history.

(56) References Cited

U.S. PATENT DOCUMENTS 5,638,176 A 6/1997 Hobbs et al.
5,805,267 A 9/1998 Goldman (Continued)

FOREIGN PATENT DOCUMENTS

WO 2020244971 A1 12/2020

OTHER PUBLICATIONS

Non-Final Office Action mailed Oct. 27, 2020 for U.S. Appl. No. 16/234,293, 12 pages.

(Continued)

*Primary Examiner* — Fernando Alcon

(57) ABSTRACT

Aspects of the present disclosure describe systems and methods for eye-tracking by steering a scan beam in a two-dimensional pattern over a scan region on the eye and detecting light reflected from a plurality of reflection points in the scan region at an angle-sensitive detector. The three-dimensional location of each reflection point is determined by triangulating the instantaneous propagation directions of the scan beam and the reflected signal from that reflection point. Gaze direction for the eye is determined from the locations of the reflection points in three-dimensional space.

12 Claims, 8 Drawing Sheets

(56) References Cited

U.S. PATENT DOCUMENTS 5,909,078 A 6/1999 Wood et al.
6,275,320 B1 8/2001 Dhuler et al.
6,333,583 B1 12/2001 Mahadevan et al.
6,806,991 B1 10/2004 Sarkar et al.
6,877,316 B1 4/2005 Sarkar et al.
7,388,699 B1 6/2008 Coffee
7,538,470 B2 5/2009 Sarkar
8,402,561 B2 3/2013 Sarkar
8,824,779 B1 9/2014 Smyth
8,955,973 B2 2/2015 Raffle et al.
10,213,105 B2 2/2019 Sarkar
10,317,672 B2 6/2019 Sarkar
11,048,327 B2 6/2021 Yang et al.
11,262,577 B2 3/2022 Sarkar
11,513,591 B2* 11/2022 Koo .................... G06V 40/19
11,586,285 B2 2/2023 Zahirovic et al.
11,816,259 B2 11/2023 Zahirovic et al.
11,914,768 B2 2/2024 Strathearn et al.
12,223,103 B2 2/2025 Strathearn et al.
12,360,361 B2 7/2025 Sarkar et al.
2002/0014579 A1 2/2002 Dunfield
2002/0041259 A1 4/2002 Lewis
2003/0121260 A1 7/2003 Sinclair
2003/0146901 A1 8/2003 Ryan
2004/0061831 A1 4/2004 Aughey et al.
2004/0120023 A1 6/2004 Bush et al.
2007/0001248 A1 1/2007 Geisberger et al.
2007/0081241 A1 4/2007 Hayashi
2007/0159599 A1 7/2007 Yamada
2007/0268808 A1 11/2007 Culver et al.
2008/0074614 A1* 3/2008 Leblanc .................. A61B 3/10
351/205
2008/0266818 A1 10/2008 Collet et al.
2008/0285103 A1 11/2008 Mizumoto
2009/0062658 A1 3/2009 Dunki-Jacobs et al.
2009/0139340 A1 6/2009 King et al.
2009/0243997 A1 10/2009 Tierling et al.
2010/0149506 A1 6/2010 De Vries
2013/0021656 A1 1/2013 Albus et al.
2013/0147836 A1* 6/2013 Small .................... G06T 19/006
345/633
2013/0242364 A1 9/2013 Kilcher et al.
2014/0375545 A1 12/2014 Ackerman et al.
2015/0047078 A1 2/2015 Sarkar et al.
2015/0235355 A1 8/2015 Mullins
2016/0029883 A1 2/2016 Cox
2016/0166146 A1* 6/2016 Sarkar .................. G02B 26/101
351/210
2016/0180143 A1* 6/2016 Horesh ................ G06V 40/193
348/44
2016/0240013 A1 8/2016 Spitzer
2016/0349515 A1* 12/2016 Alexander ........... G02B 27/017
2017/0038253 A1 2/2017 Mallinson
2017/0067609 A1 3/2017 Ichikawa et al.
2017/0109580 A1* 4/2017 Kaehler ............... G06V 40/197
2017/0115483 A1 4/2017 Aleem et al.
2017/0123489 A1 5/2017 Guenter
2017/0364732 A1 12/2017 Komogortsev
2018/0189977 A1 7/2018 Zecchini et al.
2018/0199039 A1* 7/2018 Trepte ................... G06T 15/405
2018/0210547 A1 7/2018 Sarkar
2019/0120940 A1 4/2019 Pei et al.
2019/0187482 A1* 6/2019 Lanman ............... G02B 26/105
2019/0204913 A1* 7/2019 Sarkar ................ G02B 27/0093
2019/0286228 A1 9/2019 Sangu
2019/0369253 A1 12/2019 Aleem et al.
2020/0271935 A1* 8/2020 Weber ................ G02B 27/0955
2020/0301137 A1* 9/2020 Tanaka ................... G02B 27/01
2020/0410753 A1* 12/2020 Molyneaux ........... G06T 19/006
2021/0055792 A1 2/2021 Vostrikov et al.
2021/0068652 A1* 3/2021 Nistico .................. A61B 3/113
2021/0081041 A1 3/2021 Sarkar
2021/0124416 A1 4/2021 Sarkar et al.
2021/0231962 A1* 7/2021 Hudman ................. A63F 13/26
2021/0303064 A1 9/2021 Yang et al.
2021/0344302 A1 11/2021 Brunner et al.
2022/0261074 A1* 8/2022 Zahirovic ............... G06F 3/013
2023/0110716 A1* 4/2023 Fletcher ............. G02B 27/0093
345/8
2023/0280468 A1* 9/2023 Zhu ....................... G01S 7/4816
356/5.01
2023/0319417 A1* 10/2023 Johansson .......... G02B 27/0093
2023/0393654 A1* 12/2023 Hudman ................. G06F 3/013
2024/0028116 A1 1/2024 Yang et al.
2024/0094529 A1* 3/2024 Fletcher ............. G02B 27/0172
2025/0076979 A1* 3/2025 Sarkar ..................... G06F 3/013
2025/0172996 A1 5/2025 Strathearn et al.

OTHER PUBLICATIONS

Notice of Allowance mailed Mar. 5, 2021 for U.S. Appl. No. 16/234,293, 7 pages.
Non-Final Office Action mailed Mar. 3, 2023 for U.S. Appl. No. 17/344,046, 18 pages.
Notice of Allowance mailed Jun. 2, 2023 for U.S. Appl. No. 17/344,046, 8 pages.
Non-Final Office Action mailed Apr. 29, 2021 for U.S. Appl. No. 16/232,410, 12 pages.
Notice of Allowance mailed Oct. 20, 2021 for U.S. Appl. No. 16/232,410, 7 pages.
Non-Final Office Action mailed Dec. 4, 2024 for U.S. Appl. No. 17/681,503, 10 pages.
Notice of Allowance mailed Mar. 18, 2025 for U.S. Appl. No. 17/681,503, 8 pages.
Final Office Action mailed Mar. 27, 2018 for U.S. Appl. No. 14/966,733, 22 pages.
Non-Final Office Action mailed Sep. 15, 2017 for U.S. Appl. No. 14/966,733, 21 pages.
Notice of Allowance mailed Oct. 4, 2018 for U.S. Appl. No. 14/966,733, 8 pages.
Final Office Action mailed Feb. 14, 2018 for U.S. Appl. No. 15/615,473, 9 pages.
Non-Final Office Action mailed Sep. 14, 2017 for U.S. Appl. No. 15/615,473, 14 pages.
Non-Final Office Action mailed Sep. 20, 2018 for U.S. Appl. No. 15/615,473, 12 pages.
Notice of Allowance mailed Jan. 30, 2019 for U.S. Appl. No. 15/615,473, 8 pages.
Final Office Action mailed Jun. 15, 2020 for U.S. Appl. No. 15/876,148, 8 pages.
Final Office Action mailed Aug. 23, 2019 for U.S. Appl. No. 15/876,148, 12 pages.
Non-Final Office Action mailed May 3, 2019 for U.S. Appl. No. 15/876,148, 10 pages.
Non-Final Office Action mailed Feb. 24, 2020 for U.S. Appl. No. 15/876,148, 15 pages.
Notice of Allowance mailed Jul. 16, 2020 for U.S. Appl. No. 15/876,148, 8 pages.
Non-Final Office Action mailed Sep. 3, 2021 for U.S. Appl. No. 17/087,302, 13 pages.
Notice of Allowance mailed Mar. 23, 2022 for U.S. Appl. No. 17/087,302 9 pages.
Non-Final Office Action mailed Oct. 2, 2025 for U.S. Appl. No. 19/040,127, 9 pages.
Non-Final Office Action mailed Jan. 7, 2022 for U.S. Appl. No. 17/143,048, 11 pages.
Notice of Allowance mailed May 18, 2022 for U.S. Appl. No. 17/143,048, 5 pages.
Non-Final Office Action mailed Aug. 9, 2023 for U.S. Appl. No. 17/874,385, 18 pages.
Notice of Allowance mailed Dec. 5, 2023 for U.S. Appl. No. 17/874,385, 5 pages.
Non-Final Office Action mailed Aug. 7, 2024 for U.S. Appl. No. 18/099,604, 11 pages.
Notice of Allowance mailed Oct. 15, 2024 for U.S. Appl. No. 18/099,604, 8 pages.
Corrected Notice of Allowabililty mailed Oct. 27, 2022 for U.S. Appl. No. 17/673,337 2 pages.

(56) References Cited

OTHER PUBLICATIONS

Notice of Allowance mailed Oct. 19, 2022 for U.S. Appl. No. 17/673,337 10 pages.
Non-Final Office Action mailed May 8, 2023 for U.S. Appl. No. 18/098,899, 13 pages.
Notice of Allowance mailed Jul. 10, 2023 for U.S. Appl. No. 18/098,899, 6 pages.
Non-Final Office Action mailed Jun. 18, 2020 for U.S. Appl. No. 16/236,993, 10 pages.
Notice of Allowance mailed Oct. 7, 2020 for U.S. Appl. No. 16/236,993, 8 pages.
Alex Man Ho Kwan et al., "Improved Designs for an Electrothermal In-Plane Microactuator", "Journal of Microelectromechanical Systems", Jun. 1, 2012, pp. 586-595, vol. 21, No. 3, Publisher: IEEE.
Di Liang et al., "Hybrid Integrated Platforms for Silicon Photonics", doi: 10.3390/ma3031782, ISSN 1996-1944, www. mdpi.com/journal/materials, Materials, Mar. 12, 2010, vol. 3, 1782-1802.
G. K. Fedder et al., "Laminated High-Aspect-Ratio Microstructures in a Conventional DMOS Process", Jun. 1, 1996, vol. 0-7803-298-6/96, Publisher: IEEE.
J. C. Hulme et al., "Fully integrated hybrid silicon two dimensional beam scanner", DOI: 10.1364/OE.23.005861, "Optics Express", Mar. 9, 2015, vol. 23, No. 5, Publisher Optical Society of America, Published in Santa Barbara, California.
Jacob Engelberg et al., "The Advantages of metalenses over diffractive lenses," "Nature Communications", vol. 11, dated 2020, (https://doi.org/10.1038/s41467-020-15972-9), 4 pp.
Long Que et al., "Bent-Beam Electrothermal Actuators—Part I: Single Beam and Cascaded Devices", "Journal of Microelectromechanical Systems", Jun. 1, 2001, pp. 247-254, vol. 10, No. 2, Publisher: IEEE.
Oak et al., "Development and Testing of a Multilevel Chevron Actuator-Based Positioning System", "Journal of Microelectromechanical Systems", Dec. 2011, pp. 1298-1309, vol. 20, No. 6.
Peter J. Gilgunn et al., "CMOS-MEMS Lateral Electrothermal Actuators", 10.1109/JMEMS.2007.911373, "Journal of Microelectromechanical Systems", Oct. 1, 2007, vol. 1057-7157, Publisher: IEEE, Published in: Pittsburgh, PA.
Zhaoyi Li et al., "Meta-Optics achieves RGB-achromatic focusing for virtual reality," Science Advances, vol. 7, No. 5, Jan. 27, 2021, (www.doi.org/10.1126/sciadv.abe4458), 8 pp.
Non-Final Office Action mailed Jan. 15, 2026 for U.S. Appl. No. 18/373,921, 21 pages.

* cited by examiner

200
Interrogate scan region 114 with scan beam 110
201
Detect reflected signal 112 from reflection point RP-i at time $t_i$
202
Receive output signal 120-i at processor 108
203
Determine the orientation of mirror 308 at time $t_i$
204
Determine the propagation direction of scan beam 110 at time $t_i$
205
Determine the three-dimensional location of reflection point RP-i
206
Estimate gaze vector GV of eye 116
207
For
i=1 to N Angle-Sensitive Detector 106
Optical Axis A1
Focal Point FP1
0,0
Lens 402
Position-Sensitive Element 404
Output Signal 120
x
y
z 100
Depicted at time $t_1$
Source Module 104
Point P1
Detector 106
Point P2
S1
$\theta s_1, \phi s_1$
$\theta d_1, \phi d_1$
Scan Ray 502-1
Scan Beam 110
Reflected Ray 504-1
Reflected Signal 112-1
Scan Region 114
Gaze Vector GV
Cornea 118
Eye 116
Pupil 124
Iris 122
$RPx_1, RPy_1, RPz_1$
Reflection Point RP-1
x
y
z 100
Source Module 104
Detector 106
Depicted at time $t_2$
S1
Gaze Vector GV
Scan Ray 502-2
$\theta s_2, \phi s_2$
$\theta d_2, \phi d_2$
Reflected Ray 504-2
Reflected Signal 112-2
Scan Region 114
Scan Beam 110
Cornea 118
Pupil 124
Iris 122
Reflection Point RP-2
$RPx_2, RPy_2, RPz_2$
Eye 116
x
y
z

THREE-DIMENSIONAL-IMAGE-BASED EYE TRACKING USING TRIANGULATION

CROSS REFERENCE TO RELATED APPLICATIONS

This case claims priority of U.S. Provisional Patent Application Ser. No. 63/391,059, filed Jul. 21, 2022, which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to object-tracking systems and methods.

BACKGROUND

Much information about a user can be derived from knowledge of the user's gaze direction, as well as the shape, location, orientation and/or movement of particular features of one or both of the user's eyes.

Historically, such information has been obtained using eye-tracking systems that rely on imaging systems (e.g., cameras, focal-plane arrays (FPA), etc.) that form an image of one or both eyes and complex image processing to interpret such images. Unfortunately, eye-tracking systems that employ imaging systems are notoriously slow (high-latency), expensive, bulky and require considerable processing power. As a result, they are not well suited for use in many applications.

Given such applicability and importance, improved eye-tracking systems, methods and/or structures that can form three-dimensional maps or other three-dimensional information about an eye or one or more of its features, without the use of image processing would represent a welcome addition to the art.

SUMMARY

Embodiments of the present invention steer a scan beam in a two-dimensional pattern about a scan region on an eye and detect reflections from one or more reflection points in the scan region at an angle-sensitive detector. For each reflection point, its three-dimensional location is determined by triangulation based on the geometry of the system and the angles at which light is incident on, and reflected from, that reflection point. Embodiments are suitable for use in applications such as eye imaging, eye tracking, and the like.

An advance over the prior art is realized by employing an angle-sensitive detector to detect the angle at which a reflected signal is received from a reflection point and the time at which it is received. The propagation direction of the reflected signal and the propagation direction of the scan beam from which it is derived are used to triangulate the location of the reflection point in three-dimensional space. By identifying the locations of a plurality of reflection points, a three-dimensional map of the eye, and/or three-dimensional information about features of the eye, can be constructed and used to determine the gaze vector of the eye.

An embodiment in accordance with the disclosure includes a conventional eyeglasses frame, a source module, an angle-sensitive detector, and a processor for receiving detection signals from the angle-sensitive detector and computing a location in three-dimensional space for one or more points on a scan region of an eye.

The source module is mounted at a known point near the nosepiece of the eyeglasses frame and includes a light source and a two-dimensional scanner that are collectively configured to steer a scan beam through a Lissajous pattern over a scan region on an eye.

The angle-sensitive detector is located at a known point on the outer portion of the eyeglasses frame and is configured to detect the angle at which a reflection signal containing light reflected from the eye is received. In some embodiments, multiple angle-sensitive detectors are mounted at known points on the outer portion of the eyeglasses frame. The angle-sensitive detector includes a position-sensitive detector and a lens, which are arranged such that a reflected signal passing through the focal point of the lens is redirected onto a position in the position-sensitive detector that is dependent upon the angle at which the light passes through the focal point.

The timing of signal reception at the angle-sensitive detector can be used to determine the instantaneous mirror orientation at the time the signal is detected, from which the instantaneous transmit-beam angle of the scan beam can be determined. Using the known fixed points of the scanner and angle-sensitive detector and triangulating the transmit-beam angle and the detection-element pixel (receive-signal angle), the location of the reflection point in three-dimensional space can be determined.

A processor correlates the time of arrival of the reflected signal at the angle-sensitive detector) to determine (1) the mirror angle associated with the scan beam and (2) the path of the reflected signal based on the location of the angle-sensitive detector. The processor then computes a depth (i.e., range) for the reflection point that corresponds to the intersection of the central rays of the scan beam and the reflected signal via triangulation.

In some embodiments, the cornea is assumed to be a sphere whose radius is known or can be estimated a-priori. Since the angle of incidence and reflection are equal at the reflection point, the three-dimensional location of the center of the cornea can be estimated directly from the normal vector to the reflection point.

In some embodiments, the locations of a plurality of reflection points are identified and used to develop a three-dimensional map of the eye and features within it. Gaze direction is estimated based on the location and orientation of at least one eye feature, such as the pupil.

An embodiment in accordance with the present disclosure is an eye tracking system comprising: a microelectromechanical system (MEMS) scanner for steering a scan beam in a two-dimensional pattern over a scan region of an eye; a first detector for receiving a first reflected signal from a first reflection point in the scan region at a first time, the first reflected signal including at least a portion of the scan beam, wherein the first detector is configured to provide a first output signal that is indicative of a first angle at which the first reflected signal is received at the first detector and the first time; and a processor that is configured to: (1) determine a first propagation direction for a scan ray of the scan beam at the first time; (2) determine a second propagation direction for a first reflected ray of the first reflected signal at the first time; and (3) determine a first location of the first reflection point in three-dimensional space by triangulating the first and second propagation directions.

Another embodiment in accordance with the present disclosure is a method for eye tracking that includes: steering a scan beam in a two-dimensional pattern over a scan region of an eye; receiving a first reflected signal from a first reflection point in the scan region at a first detector at a first time, wherein the first reflected signal includes at least a portion of the scan beam, and wherein the first detector is an angle-sensitive detector; determining a first propagation direction for a scan ray of the scan beam at the first time; determining a second propagation direction for a first reflected ray of the first reflected signal at the first time; and determining a first location of the first reflection point in three-dimensional space by triangulating the first and second propagation directions.

DETAILED DESCRIPTION

Figures 1A, 1B:
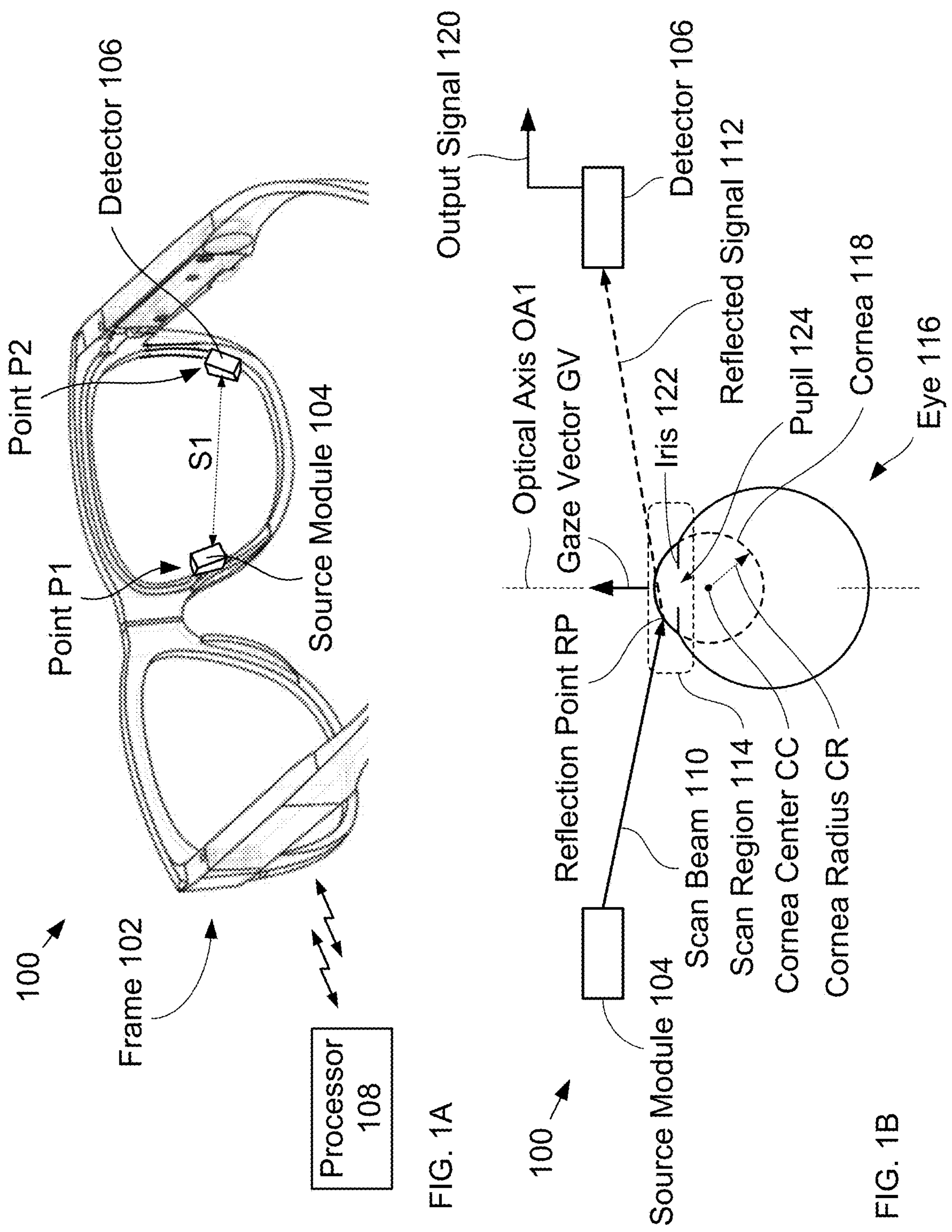
FIGS. 1A-B depict schematic drawings of a perspective view and illustrative geometric arrangement, respectively, of an eye-tracking system in accordance with the present disclosure.

FIGS. 1A-B depict schematic drawings of a perspective view and illustrative geometric arrangement, respectively, of an eye-tracking system in accordance with the present disclosure. System 100 includes conventional eyeglasses frame 102, source module 104, detector 106, and processor 108. System 100 is analogous to eye-tracking systems described in detail in U.S. Pat. Nos. 10,213,105, 10,317,672, 10,908,683, and 11,379,035, each of which is incorporated herein by reference.

Source module 104 is affixed to eyeglasses frame 102 at point P1, which is near its nosepiece and detector 106 is affixed to frame 102 at point P2, which is near a temple of the frame. As a result, source module 104 and detector 106 are located on opposite sides of the eye being tracked and separated by fixed distance S1. It should be noted that the locations of source module 104 and detector 106 as described herein are merely exemplary and that any suitable location on eyeglasses frame 102 can be used.

Source module 104 is a two-dimensional light scanner configured to steer scan beam 110 in a two-dimensional pattern about scan region 114 on eye 116. Source module 104 is described in more detail below and with respect to FIGS. 3-4.

Detector 106 is an angle-sensitive detector for detecting one or more reflections of scan beam 110 received from reflection points within scan region 114 and determining the angle at which they are received at the detector. For the purposes of this Specification, including the appended claims, the term "angle-sensitive detector" is defined as a light-detection element that generates an output signal in response to received light, where the output signal includes an indication of the three-dimensional direction, relative to the angle-sensitive detector, at which the light is propagating when it is received at the angle-sensitive detector. As will be appreciated by one skilled in the art, after reading this Specification, reflected signal 112 propagates along a direction characterized by a three-dimensional vector having two angles, $\theta$ in the x-z plane and $\phi$ in the y-z plane (as discussed below and with respect to FIGS. 5A-B). To simplify the discussion herein, however, the propagation direction is typically simply referred to as "an angle."

Although the depicted example includes only one angle-sensitive detector, some embodiments in accordance with the present disclosure include multiple angle-sensitive detectors. Furthermore, some embodiments include at least one non-angle-sensitive detector. An angle-sensitive detector in accordance with the present disclosure is described in more detail below and with respect to FIGS. 5A-B.

It is an aspect of the present disclosure that the use of one or more angle-sensitive detectors to detect reflections from an eye affords embodiments in accordance with the present disclosure significant advantages over prior-art eye-tracking systems. Specifically, the inclusion of at least one angle-sensitive detector enables determination of the three-dimensional location of a reflection point in scan region 114 via triangulation, as discussed below.

Processor 108 is a conventional processor that is in communication with source module 104 and detector 106. In the depicted example, the processor, source, and detectors are in wireless communication; however, in some embodiments, at least some of these elements are in communication via a conventional wired communications path.

Processor 108 is a conventional processor/controller that is configured to provide drive signals to source module 104, receive output signal 120 from detector 106, generate topological information about a scanned eye, estimate a gaze angle for the scanned eye, and the like. In the depicted example, the processor maintains a calibration of the beam-transmit angle vs. drive signal phase and therefore can determine the instantaneous propagation direction of scan beam 110 based on the time at which reflected signal 112 is detected by detector 106.

Figure 2:
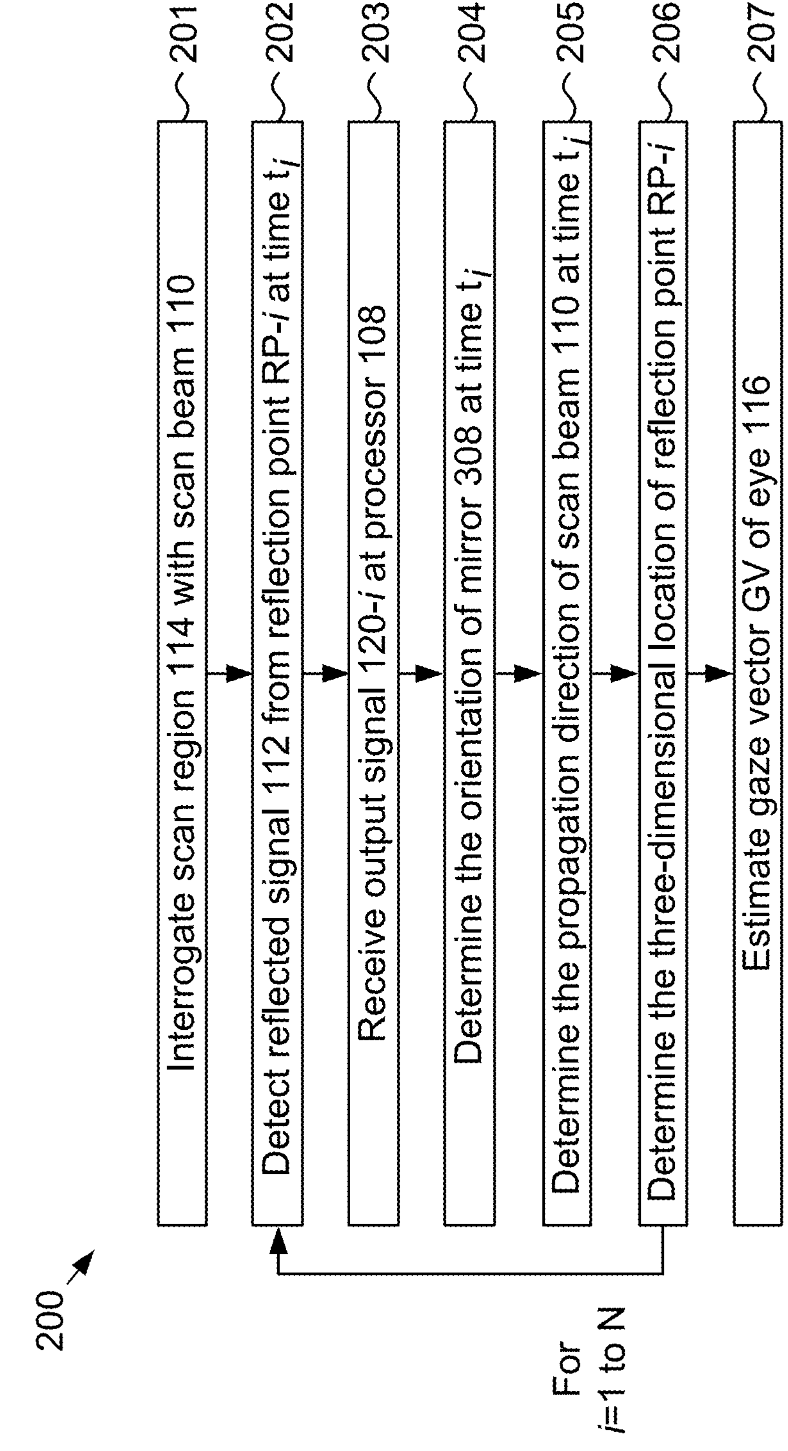
FIG. 2 depicts operations of a method for eye tracking in accordance with the present disclosure.

FIG. 2 depicts operations of a method for eye tracking in accordance with the present disclosure. Method 200 is described with continuing reference to FIGS. 1 and 3-6. Method 200 begins with operation 201, wherein source module 104 interrogates scan region 114 with scan beam 110. Scan region 114 is a portion of eye 116 that includes cornea 118, iris 120, and pupil 122.

Figures 3A, 3B:
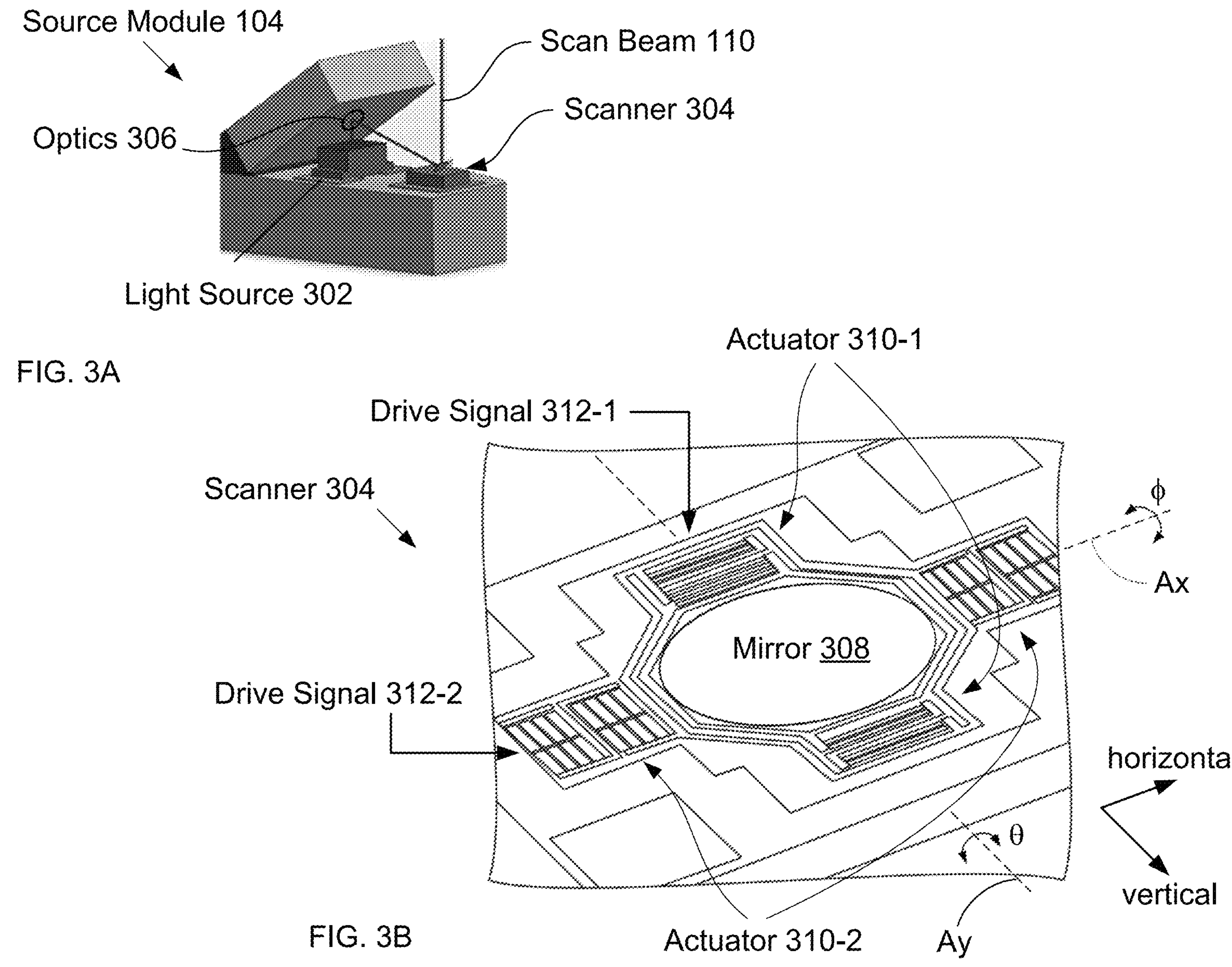
FIG. 3A depicts a schematic drawing of a perspective view of a source module in accordance with the present disclosure.
FIG. 3B depicts a schematic drawing of a perspective view of a scanner in accordance with the present disclosure.

FIG. 3A depicts a schematic drawing of a perspective view of a source module in accordance with the present disclosure. Source module 104 includes light source 302, scanner 304, and optics 306.

Light source 302 is a light emitter whose output is redirected toward scan region 114 by scanner 304. In the depicted example, light source 302 is a conventional laser; however, other emitters, such as super-luminescent LEDs, etc., can be used without departing from the scope of the present disclosure.

Typically, the light emitted by light source 302 is at least partially collimated en route to scanner 304 by optics 306, thereby realizing scan beam 110. In some embodiments, scanner 304 is configured to collimate, or partially collimate, the light received from light source 302.

FIG. 3B depicts a schematic drawing of a perspective view of a scanner in accordance with the present disclosure. Scanner 304 is a two-axis beam-steering device suitable for directing scan beam 110 toward scan region 114 and steering it about the scan region in a two-dimensional pattern. In the depicted example, scanner 304 is a two-axis resonant MEMS scanning element (e.g., a gimbal-mounted mirror, etc.) comprising mirror 308 and actuators 310-1 and 310-2 (referred to, collectively, as actuators 310).

In response to drive signals 312-1 and 312-2 from processor 108, actuators 310-1 and 310-2 drive mirror 308 into rotational resonance about orthogonal axes Ax and Ay, respectively.

In the depicted example, drive signals 312-1 and 312-2 are provided to source module 104 such that scanner 304 steers the scan beam in a Lissajous pattern about scan region 114, where the Lissajous pattern is defined by parametric equations $x=A\sin(at+\delta)$; $y=B\sin(bt)$. In some embodiments, drive signals 312-1 and 312-2 drive scanner 304 to produce a precessing Lissajous pattern on the scan region. It should be noted, however, that other patterns and/or scan regions can be used without departing from the scope of the present disclosure.

Non-limiting examples of source modules suitable for use in accordance with the present disclosure are discussed in detail in US Patent Publications 20210124416, 20210081041, and 20180210547, each of which is incorporated herein by reference.

As scan beam 110 proceeds through its scan pattern, some or all of its light is reflected as reflected signal 112 toward detector 106 at a plurality of N reflection points RP, where N has any practical integer value.

For i=1 through N:

At operation 202, at time $t_i$, scan beam 110 sweeps across reflection point RP-i, from which some or all of its light is reflected or scattered toward detector 106. Detector 106 detects the reflected light pulse as reflected signal 112-*i*.

Figure 4:
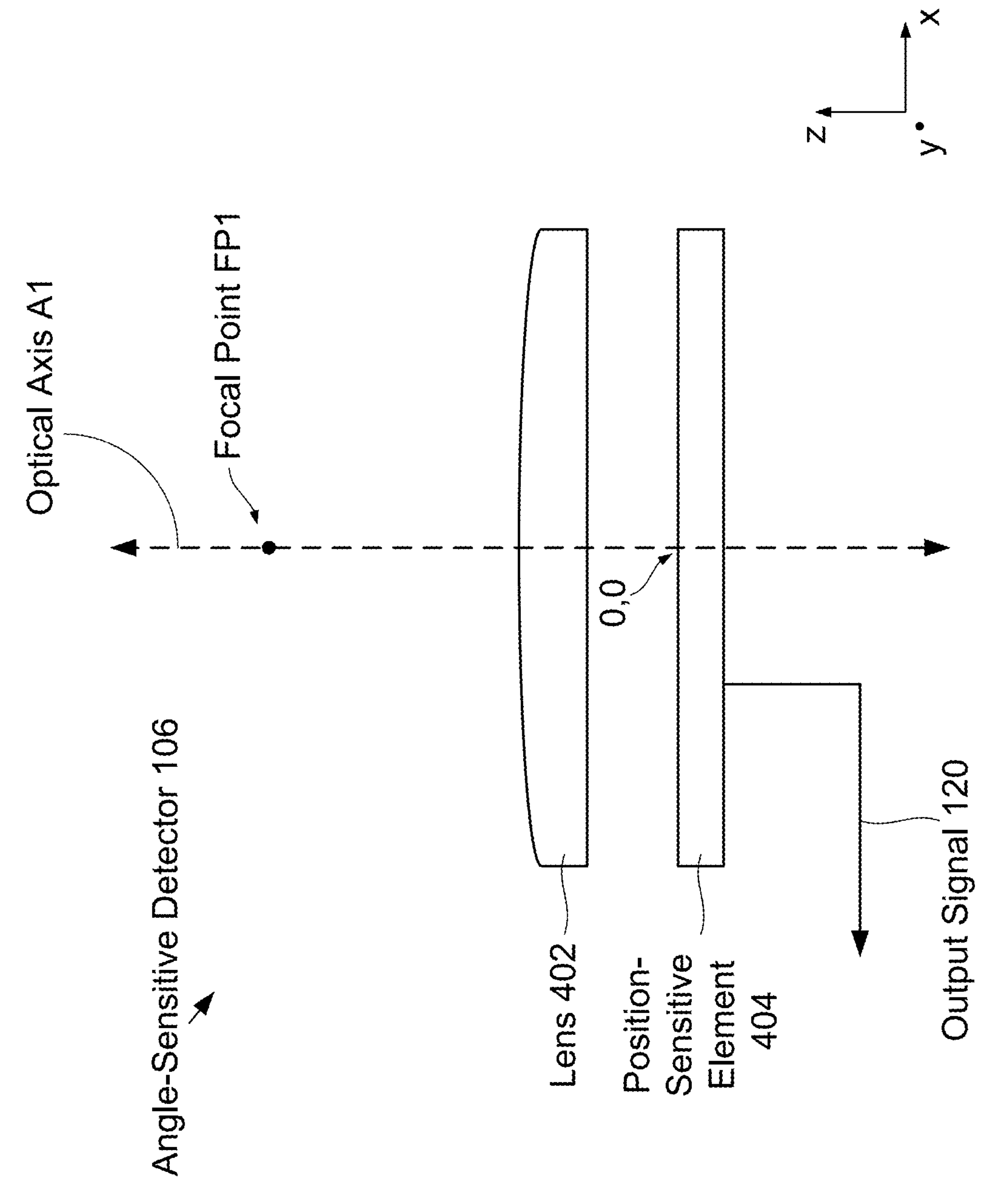
FIG. 4 depicts a schematic drawing of an illustrative example of an angle-sensitive detector in accordance with the present disclosure.

FIG. 4 depicts a schematic drawing of an illustrative example of an angle-sensitive detector in accordance with the present disclosure. Detector 106 comprises lens 402 and position-sensitive element 404.

Lens 402 is a conventional plano-convex refractive lens having focal point FP1. Lens 402 is configured to receive light of scan beam 110 from the scan region and direct it to a location on position-sensitive element 404 based on the propagation direction of the light as it passes through focal point FP1. As will be appreciated by one skilled in the art, after reading this Specification, the x,y position at which the incident light is centered on position-sensitive element 404 is directly dependent upon the angle of the central ray of the light as it propagates through focal point FP1. Although the depicted example includes a plano-convex lens, it will be clear to one skilled in the art, after reading this Specification, that a wide range of optical elements can be used in lens 402 without departing from the scope of the present disclosure.

Position-sensitive element 404 is a conventional light-detection device whose output signal (i.e., output signal 406) is based on the x-y location at which light is received on the device.

In the depicted example, position-sensitive element 404 is a conventional event camera, which includes a two-dimensional array of individual detector pixels, each of which provides a unique detection signal as part of output signal 406. As will be appreciated by one skilled in the art, after reading this Specification, for such a position-sensitive element, output signal 406 includes data only for those pixels whose detection signals change. The use of an event camera affords some embodiments in accordance with the present disclosure with significant advantages over the prior art. For example, an event camera inherently provides the timing required to determine the instantaneous angle of mirror 308 and thus the angle of scan beam 110.

In some embodiments, position-sensitive element 404 includes a light-detection device other than an event camera. Light-detection devices suitable for use in position-sensitive element 404 include, without limitation, position-sensitive diodes (PSD), detector arrays (analogous to imaging focal-plane arrays), four-quadrant diodes, arrays of avalanche photodiodes, single photon avalanche diode (SPAD) arrays and the like.

In some embodiments, position-sensitive element 404 is a two-dimensional array of single-photon avalanche diodes (SPADS). In such embodiments, the position-sensitive element and lens collectively define a "timing camera" that records the time of arrival of photons on the SPAD array, rather than measuring intensity. Because the reflection point giving rise to the reflected rays can be triangulated, as discussed below, time-of-flight resolution is not of concern. Instead, the timing of a photon detection at an individual SPAD can be correlated with the instantaneous orientation of scanner 304 to triangulate the location of reflection point RP. It should be noted that the timing resolution required for such operation is merely on the order of the scan rate for scan beam 110. Given that the scan beam and detector are both simultaneously controlled by processor 108 it is possible to devise timing implementations by selective strobing light source 302 and the detection interval on detector 106. As will be appreciated by one skilled in the art, after reading this Specification, such an approach enables the use of relatively low frame-rate camera (i.e., a standard "non-event" camera, etc.) instead of an event camera.

In some embodiments wavelength or modulation matching of detector 106 to the operation of light source 302 is used, which can improve signal-to-noise ratio by, for example, mitigating the effects of ambient light, and the like.

Since source module 104 and detector 106 are separated by fixed distance S1, the central reflected ray of the reflected signal from different reflection points in scan region 114 travel along different propagation directions toward detector 106. At detector 106, these different propagation directions manifest as different angles at which the reflected rays pass through focal point FP1 of lens 402. As a result, the reflected rays of reflected signals from different reflection points are incident on position-sensitive element 404 at different x,y locations.

Figure 5A:
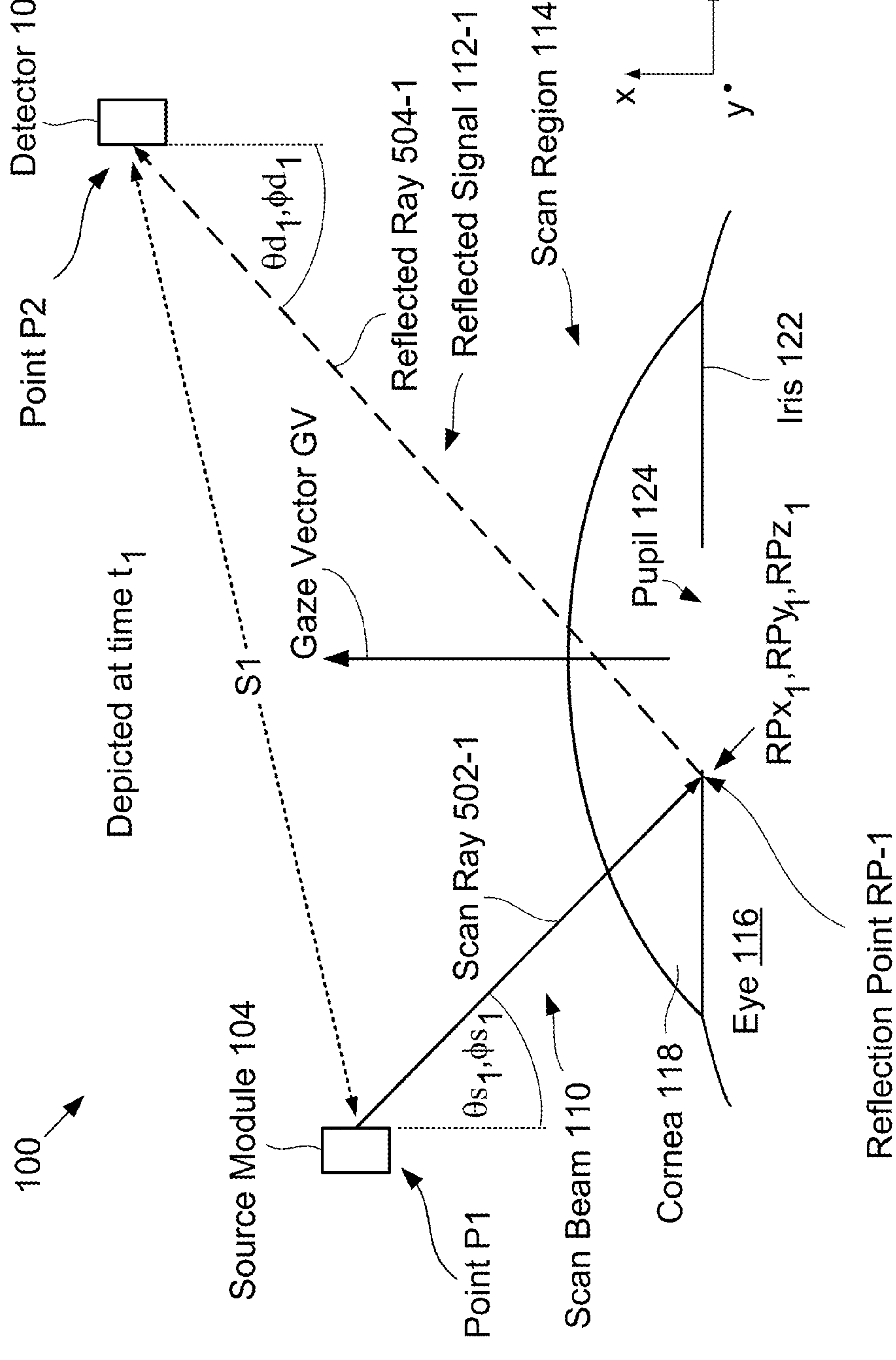
FIGS. 5A-B depict schematic drawings of the operational arrangement of system 100 while interrogating different reflection points in a scan region in accordance with the present disclosure.
Figure 5B:
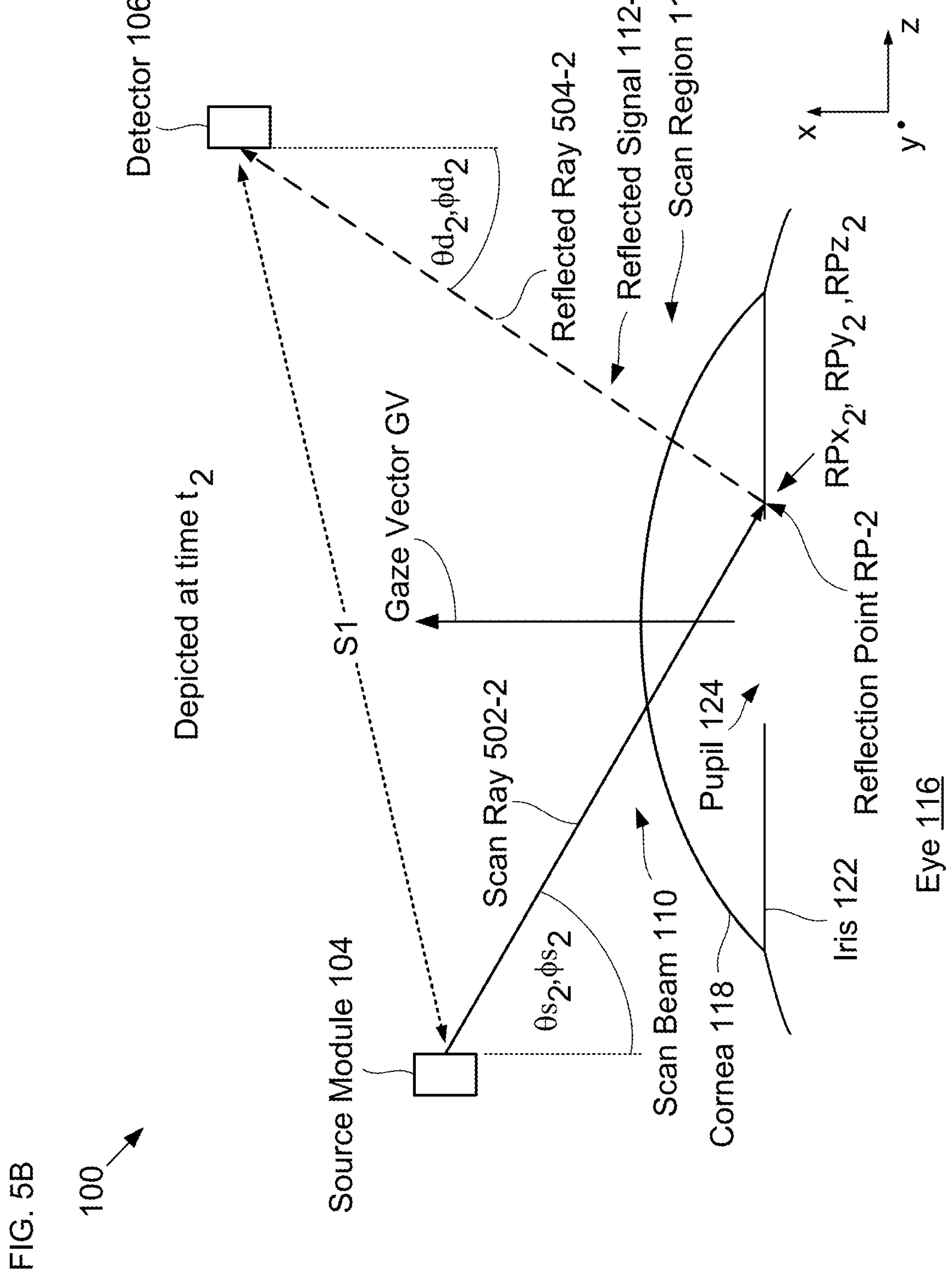

FIGS. 5A-B depict schematic drawings of the operational arrangement of system 100 while interrogating different reflection points in a scan region in accordance with the present disclosure.

As depicted in FIG. 5A, at a first time, $t_1$, mirror 308 is in a first orientation, characterized by angles $\theta$ and $\phi$, as depicted in FIG. 3B. In this orientation, mirror 308 directs scan beam 110 (characterized by central scan ray 502) toward reflection point RP-1. The instantaneous propagation direction of scan ray 502 is characterized by instantaneous angles $\theta s_1$ and $\phi s_1$, where $\theta s_1$ is its angle in the x-z plane and $\phi s_1$ is its angle in the y-z plane.

In the depicted example, reflection point RP-1 is located on iris 122 near pupil 124, thereby giving rise to a diffuse reflection that manifests as reflected signal 112, which is characterized by reflected ray 504-1. Reflected ray 510-1 is characterized by angles $\theta d_1$ and $\phi d_1$ as it arrives at the focal point of detector 106, where $\theta d_1$ is its angle in the x-z plane and $\phi d_1$ is its angle in the y-z plane.

As depicted in FIG. 5B, at a second time, $t_2$, the orientation of mirror 308 has changed to a second orientation. In this orientation, mirror 308 scan ray 502 is directed toward reflection point RP-2 such its instantaneous propagation direction is characterized by angles $\theta s_2$ and $\phi s_2$. In the depicted example, reflection point RP-2 is also located on iris 122 near the opposite side of pupil 124 from reflection point RP-1, thereby giving rise to reflected ray 504-2. Reflected ray 504-2 is characterized by angles $\theta d_2$ and $\phi d_2$ as it arrives at the focal point, FP1, of detector 106.

It should be noted that FIGS. 5A-5B do not explicitly denote the refraction that occurs at the surface of the Cornea 118. The iris plane and pupil edge reflections would all be subject to corneal refraction and their true 3D positions would require refractive correction. The correction may be readily applied by employing a corneal position and cornea model determined through the use of the specular reflection from the surface of the cornea as discussed below.

Figure 6:
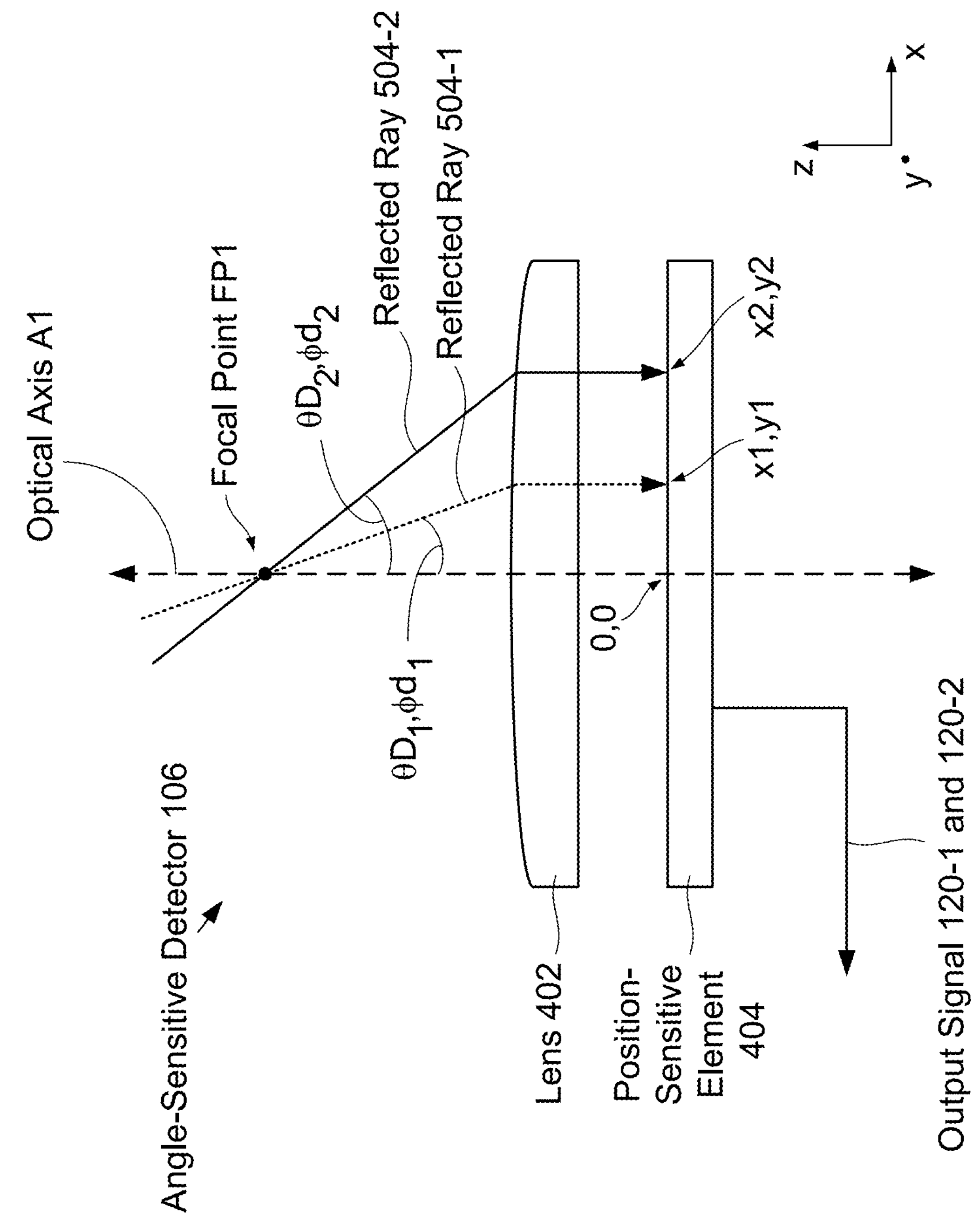
FIG. 6 depicts a schematic drawing of a cross-sectional view of angle-sensitive detector 106 receiving reflected rays 504-1 and 504-2 in accordance with the present disclosure.

FIG. 6 depicts a schematic drawing of a cross-sectional view of detector 106 receiving reflected rays 504-1 and 504-2 in accordance with the present disclosure.

As reflected ray 504-1 passes through focal point FP1, lens 402 converts its angular configuration of $\theta d_1$, $\phi d_1$ into lateral position, x1, y1 on position-sensitive element 404.

In similar fashion, as reflected ray 504-2 passes through focal point FP1, lens 402 converts its angular configuration of $\theta d_2$, $\phi d_2$ into lateral position, x2, y2 on position-sensitive element 404.

At times $t_1$ and $t_2$, therefore, detector 106 generates output signals 120-1 and 120-2, which are indicative of the positions in the x-y plane at which position-sensitive element 404 receives reflected rays 504-1 and 504-2 at these times.

Returning now to method 200, at operation 203, detector 106 provides output signal 120-*i* to processor 108, where output signal 120-*i* is indicative of time, $t_i$, at which detector 106 detects reflected signal 112-*i* from reflection point RP-i, as well as the corresponding angles at which reflected signal 112-*i* was received at the detector. In other words, output signal 120-*i* provides two key pieces of information to processor 108—namely, for each reflection point, RP-i, in scan region 114, the time, $t_i$, at which a reflection is received and the instantaneous propagation direction of reflected ray 504-*i* as it passes through the focal point FP1 of detector 106.

At operation 204, processor 108 determines the orientation of mirror 308 at time $t_i$.

At operation 205, processor 108 determines the instantaneous propagation direction of scan ray 502-*i*, as characterized by instantaneous angles $\theta s_1$ and $\phi s_1$, based on the orientation of mirror 308 at time $t_i$.

At operation 206, processor 108 determines an instantaneous location $RPx_i, RPy_i, RPz_i$ in three-dimensional space for reflection point RP-i by triangulating the instantaneous propagation directions of scan ray 502-*i* and reflected ray 504-*i* in view of the fixed locations L1 and L2 of source module 104 and detector 106.

The ability to "triangulate" the locations of a plurality of reflection points in a scan region based on scan rays 502 and reflected rays 504 affords embodiments in accordance with the present disclosure with significant advantages over the prior art. For example, features of an eye, such as the outline of its pupil, the size/shape of its iris, and the like, can be precisely traced in three-dimensional space. In some embodiments, a three-dimensional map of the entire iris is used to develop an estimate of the plane of the pupil.

It should be noted that, typically, the determination of the location of each reflection point in a scan region is subject to refraction from interaction with the tissue of the eye (e.g., the corneal tissue). As a result, in some embodiments, a-priori knowledge (or estimation) of the refractive index of the corneal tissue at one or more locations in the scan region is used in some embodiments to improve the accuracy of the determination of the three-dimensional location. For example, in some embodiments, corneal position is determined using suitable eye models based on glint reflections as embodied by reference material in the literature. In some cases, a system in accordance with the present disclosure is employed as a subsystem of a prior-art camera-based eye tracker employing a detector such as detector 106, a Lissajous scanning eye tracker employing source module 104, or a combination thereof.

In some embodiments, a calibration step is employed in which processor 108 estimates an index of refraction and effective corneal radius through numerical means, such as regression, machine learning, and the like by collecting eye-specific data per user by employing a per user calibration. A per user calibration is performed by presenting a plurality of calibration gaze targets optionally characterized by known ground truth locations. The calibration gaze targets may be presented to the user as physical markers located relative to a headset frame by a headset mounted camera, through a head-mounted display or other such means.

At operation 207, gaze vector GV is determined for eye 116 based on the three-dimensional location at least one reflection point RP.

In the depicted example, gaze vector GV is determined by first identifying the edge of pupil 122 based on reflection points RP-1 through RP-N. The edge of pupil 122 defines a pupil plane that is characterized by a normal vector that functions as a simple estimate of gaze vector GV.

For the purposes of this Specification, including the appended claims, the "gaze vector" of an eye is defined as the gaze direction of the eye. As may be readily appreciated by those skilled in the art, we note that the optical axis OA1 of eye 116 is not the same as a visual axis. More specifically, the gaze and optical-axis vectors are normally offset by a nominal amount (typically referred to as Kappa) such that, for example, optical axis OA1 may be substantially aligned with an optical centerline of eye 116, while the visual axis is more substantially aligned with a visual acuity location of the eye, namely the fovea centralis. The fovea is responsible for sharp central vision, which is necessary in humans for activities where visual detail is of primary importance, such as reading and driving. Accordingly, a gaze vector is preferably indicated by a vector extending outward along the visual axis. As used herein and as will be readily understood by those skilled in the art, "gaze" suggests looking at something—especially that which produces admiration, curiosity or interest—among other possibilities. For the purposes of this Specification, including the appended claims, this nominal offset between the gaze vector and the optical axis is ignored.

In some embodiments, a per-user calibration is performed to correct for the offset between gaze vector and optical axis.

Figure 7:
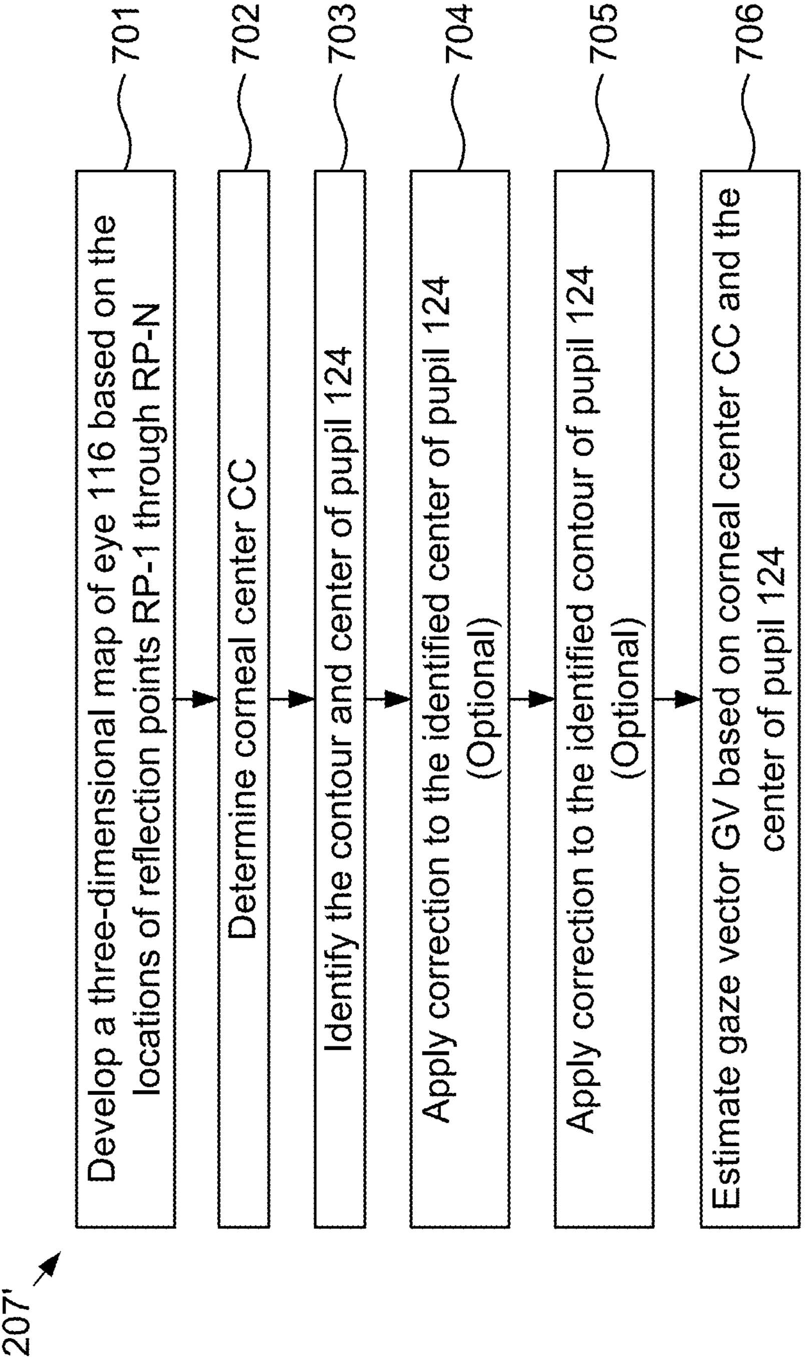
FIG. 7 depicts an alternative sub-method suitable for use as operation 207 to determine the gaze vector of an eye in accordance with the present disclosure.

FIG. 7 depicts a sub-method suitable for use as an alternative operation 207 to determine the gaze vector of an eye in accordance with the present disclosure. Operation 207' begins with sub-operation 701, in which processor 108 develops a three-dimensional map of scan region 114 based on the locations determined for reflection points RP-1 through RP-N.

It should be noted that the intensity of the reflected signal at the detector can be used as an indication as to whether the reflection is specular or diffuse. For example, a specular reflection from the eye region in close proximity to the pupil (i.e., the cornea) is most likely to be of highest magnitude (referred to as a "corneal glint"). Furthermore, since it is known that the angles of incidence and reflection at a specular reflection point are equal, the normal vector from its location can be easily determined.

If the corneal radius is known (or can be assumed), therefore, the three-dimensional location of a corneal glint identified by a particular scanner/detector combination can be used to determine the three-dimensional position of the cornea center by projecting along the direction of its normal vector by a magnitude equal to the radius of the cornea.

At sub-operation 702, processor determines the corneal center, CC, of cornea 118. Using an a-priori estimate of corneal radius CR, calculation of a normal vector having length CR at any reflection point identifies the three-dimensional location of corneal center CC. In some embodiments, the corneal radius is directly measured using system 100 (e.g., during calibration, etc.).

Typically, a specular reflection (i.e., glint) from the cornea can be readily identified as a reflection of higher intensity relative to reflections from other portions of the eye (e.g., the iris, pupil, scleral regions, etc.). In a first-order spherical model of the cornea, only one glint reflection occurs from the scanner to the detector. In some embodiments, multiple scanners and/or multiple detectors are used to give rise to the detection of multiple glints corresponding to different scanner/detector combinations. As noted above, since it is known that the angle of incidence is equal to the angle of reflection at a specular reflection, the reflection normal at its location is readily obtained.

In addition, diffuse elements in the scan region (e.g., the iris, eye lids, etc.) can give rise to lower-intensity reflections (due to Lambertian reflection). The three-dimensional locations of such diffuse features can also be determined with care being taken to account for second-order effects such as sub-surface scattering and refraction from intermediate surfaces such as the cornea.

At sub-operation 703, processor 108 determines the contour and center of pupil 124 based on the three-dimensional map of eye 116 developed in operation 207. In some embodiments, the size/center of pupil 124 is determined using another method, such as methods of pupillometry described in detail in U.S. Pat. No. 11,586,285 and U.S. Pat. Pub. No. 20210303064, each of which is incorporated herein, in its entirety, by reference.

At optional sub-operation 704, a correction factor is applied to the identified center of pupil 124 to account for the refractive power of the cornea.

At optional sub-operation 705, a correction factor is applied to the identified contour of pupil 124 to account for the refractive power of the cornea. Typically, this correction factor is based on the corneal-center estimate determined in sub-operation 702 and, in some embodiments, also on the correction factor employed in optional sub-operation 704.

At sub-operation 706, processor 108 generates an estimate of gaze vector GV based on the locations of corneal center CC and the center of pupil 122.

In some embodiments, in addition to using the contour of the pupil, the plane of the pupil is identified (typically also using a correction factor to account for corneal refraction). In such embodiments, sub-operation 706 includes using the refraction-corrected position of the plane of the iris to determine the optic axis/gaze vector of the eye.

In some embodiments, the three-dimensional locations of one or more reflection points are used to refine the estimate of gaze vector, reduce noise, identify which reflection points are on the cornea, and the like.

It is to be understood that the disclosure teaches just some examples of illustrative embodiments and that many variations of the invention can be devised by those skilled in the art, after reading this disclosure, and that the scope of the present invention is to be determined by the following claims.

What is claimed is:

1. An eye-tracking system comprising:

a microelectromechanical system (MEMS) scanner for steering a scan beam in a two-dimensional pattern over a scan region of an eye;

a first detector that is an angle-sensitive detector, wherein the first detector includes (i) a lens having a focal point and (ii) a position-sensitive element, and wherein the first detector is configured to receive a first reflected signal having a first reflected ray that passes through the focal point at a first angle, the first reflected signal being a portion of the scan beam reflected from a first reflection point in the scan region at a first time, and further wherein the first detector is configured such that the position-sensitive element receives the first reflected ray at a position that depends on the first angle and provides a first output signal that is indicative of the first angle; and a processor that is configured to:

(1) determine a first propagation direction for a scan ray of the scan beam at the first time;

(2) determine a second propagation direction for the first reflected ray at the first time based on the first output signal; and (3) determine a first location of the first reflection point in three-dimensional space by triangulating the first and second propagation directions.

2. The system of claim 1 wherein the position-sensitive element comprises an element selected from the group consisting of a position-sensitive diode (PSD), a detector array, a focal-plane array, a four-quadrant diode, and an array of single-photon avalanche diodes.

3. The system of claim 1 further including an eyeglasses frame, wherein the MEMS scanner is affixed to the eyeglasses frame at a first point and the detector is affixed to the eyeglasses frame at a second point, and wherein the first and second points are on opposite sides of the eye.

4. The system of claim 1 further including a second detector for receiving a second reflected signal from a second reflection point in the scan region at a second time, the second reflected signal including at least a portion of the scan beam, wherein the second detector is configured to provide a second output signal that is indicative of the second time, and further wherein the processor is further configured to determine a second location of the second reflection point based on the second time.

5. The system of claim 1 wherein the processor is further configured to:

(4) generate a three-dimensional map of the scan region based on a plurality of locations of reflections points that includes the first location; and (5) generate an estimate of gaze direction for the eye based on the three-dimensional map.

6. The system of claim 5 wherein the processor is further configured to (6) identify a second location of the cornea center based on the first location and the first and second propagation directions, and wherein the estimate of gaze direction is further based on the second location.

7. A method for eye tracking that includes:

steering a scan beam in a two-dimensional pattern over a scan region of an eye;

receiving a first reflected signal from a first reflection point in the scan region at a first detector at a first time, wherein the first reflected signal includes a first reflected ray that includes at least a portion of the scan beam, and wherein the first detector is an angle-sensitive detector comprising (i) a lens having a focal point and (ii) a position-sensitive detector, and further wherein the first reflected ray is received such that it passes through the focal point at a first angle and is received at a position on the position-sensitive detector that is based on the first angle;

providing a first output signal from the first detector, wherein the first output signal is indicative of the first angle;

determining a first propagation direction for a scan ray of the scan beam at the first time;

determining a second propagation direction for the first reflected ray at the first time based on the first output signal; and determining a first location of the first reflection point in three-dimensional space by triangulating the first and second propagation directions.

8. The method of claim 7 further comprising:

estimating a second location of a cornea center for a cornea of the eye based on the first and second propagation directions and the first location; and estimating a gaze direction for the eye based on the second location.

9. The method of claim 7 further comprising generating an estimate of a gaze direction for the eye based on the first location.

10. The method of claim 7 further comprising providing the angle-sensitive detector such that the position-sensitive detector includes an element selected from the group consisting of a position-sensitive diode (PSD), a detector array, a focal-plane array, a four-quadrant diode, and an array of single-photon avalanche diodes.

11. The method of claim 7 further comprising:

receiving a plurality of reflected signals at the first detector, the plurality of reflected signals including the first reflected signal, each reflected signal of the plurality thereof being received from a different reflection point of a plurality of reflection points in the scan region at a different time of a plurality of times that includes the first time, wherein each reflected signal of the plurality thereof includes a reflected ray that passes through the focal point at a corresponding angle; and for each time of the plurality thereof:

(a) determining a propagation direction for the scan ray of the scan beam corresponding to the time;

(b) generating an output signal at the first detector, the output signal being indicative of the corresponding angle of the reflected ray of the reflected signal received at the time;

(c) determining a propagation direction for the reflected ray of the reflected signal received at the time based on the output signal; and (d) determining a location in three-dimensional space for the corresponding reflection point by triangulating the propagation direction for the scan ray and the corresponding propagation direction for a reflected ray at the time.

12. The method of claim 11 further comprising:

generating a three-dimensional map of the eye based on the plurality of locations; and estimating a gaze direction for the eye based on the three-dimensional map.

* * * * *